US006008929A

United States Patent [19]

Akimoto et al.

[11] Patent Number: 6,008,929

[45] Date of Patent: Dec. 28, 1999

[54] IMAGE DISPLAYING APPARATUS AND METHOD

[75] Inventors: Osamu Akimoto, Tokyo; Yoshinori Tanaka, Kanagawa, both of Japan

[73] Assignee: Sony Corporation, Japan

[21] Appl. No.: 09/107,143

[22] Filed: Jun. 30, 1998

[30] Foreign Application Priority Data

Jul. 2, 1997 [JP] Japan .................................... 9-177387

[51] Int. Cl.[6] ................................ G02F 1/03; G09G 3/00

[52] U.S. Cl. ............................ 359/264; 359/290; 345/59; 345/89; 345/98; 345/102; 348/770

[58] Field of Search .................................... 359/264, 290, 359/298; 345/59, 87, 88, 89, 98, 102; 348/770, 771

[56] References Cited

U.S. PATENT DOCUMENTS

| | | | |
|---|---|---|---|
| 5,239,293 | 8/1993 | Barbier | 345/98 |
| 5,416,496 | 5/1995 | Wood | 345/102 |
| 5,729,243 | 3/1998 | Cavallerano et al. | 345/59 |
| 5,856,814 | 1/1999 | Yagyu | 345/89 |

FOREIGN PATENT DOCUMENTS

| | | |
|---|---|---|
| 0 261 896 A2 | 3/1988 | European Pat. Off. . |
| 93/24921 | 12/1993 | WIPO . |

*Primary Examiner*—Loha Ben

*Attorney, Agent, or Firm*—Rader, Fishman & Grauer; Ronald P. Kananen

[57] ABSTRACT

An image displaying apparatus and method is provided which can provide a satisfactory display with a gradation of intensity even with a spatial light modulator which provides a binary light modulation. A light from a light source 1 is modulated by a spatial light modulator 3 which modulates a light at each pixel thereof correspondingly to a pixel data of an image to be displayed. When the pixel state of the spatial light modulator 3 is being changed, the light source 1 is turned off. When the pixel state of the spatial light modulator 3 is steady, a light pulse is irradiated from the light source 1 to the spatial light modulator 3 to display the image.

16 Claims, 15 Drawing Sheets

| | RESPONSE OF SLM | RECOGNIZABLE INTENSITY |
|---|---|---|
| CHARACTERISTIC A |  | LOW |
| CHARACTERISTIC B |  | HIGH |

IMAGE DISPLAYING APPARATUS AND METHOD

BACKGROUND OF THE INVENTION

1. Field of the Invention:

The present invention relates to an apparatus and method for displaying an image through modulation of an incident light from a light source by a spatial light modulator which modulates the light at each pixel thereof in a binary manner.

2. Description of Related Art:

Liquid crystal display units using a liquid crystal panel as a spatial light modulator have widely been used as image displaying apparatuses which display an image through modulation of an incident light from a light source by the spatial light modulator which modulates the light at each pixel thereof. Many of such conventional image displaying apparatuses are of a type in which a TN liquid crystal or an STN liquid crystal is used as the liquid crystal panel and continuously changed in state to modulate the light intensity. However, such liquid crystal panels responds slowly and cannot operate at a high speed.

To solve such problems of the conventional liquid crystal panels, a spatial light modulator has been proposed which is made of a light modulating material capable of working fast, such as ferroelectric liquid crystal (FLC). However, the light modulating material such as the FLC is hard to continuously change in state and can normally take only two states. Therefore, the light or optical modulation by the spatial light modulator using such a light modulating material only turns on and off a light for the binary light modulation.

For a display with a gradation of light intensity in an image displaying apparatus using such a spatial light modulator, a pulse width modulation is done by the spatial light modulator turning on and off the incident light. The human eyes have a persistence so that a quantity of incident light upon the eyes is integrated and the result of the integration is recognized as a light intensity. So, if the pulse width modulation could be effected at a sufficiently high speed, the human eyes would recognize an incident light as if the light had a gradation of intensity.

FIG. 1 shows the concept of such an image displaying apparatus. A light source 101 irradiates a light through a light-irradiation optical system 102 to a spatial light modulator 103. The light reflected from the spatial light modulator 103 is projected by a light-projection optical system 104 onto a screen 105. Thus an image is displayed on the screen 105. The light source 101 is continuously turned on to provide the light at a predetermined intensity, and the light from the source 101 is modulated in pulse width by the spatial light modulator 103 which turns on and off the light source 101. It should be appreciated that the spatial light modulator 103 may be of a transmission type although that illustrated in FIG. 1 is of a reflection type.

FIG. 2 shows the basic principle of a pulse width modulation adopted in the above-mentioned image displaying apparatus to realize a display with a gradation of light intensity. FIG. 2 shows a relationship between patterns of modulation by the spatial light modulator 103 and light intensities recognizable by the human eyes (recognizable intensity). As illustrated, the human eyes will integrate a quantity of light reflected and modulated by the spatial light modulator 103, and recognize the integrated value as an intensity. Therefore, even if an actual light intensity is constant, as the width of a light pulse reflected from the spatial light modulator 103 is changed, the intensity recognized by the human eyes will change correspondingly to a magnitude of the pulse width change. Therefore, by controlling the pattern of modulation by the spatial light modulator 103, it is possible to effect an intensity modulation of a light.

As illustrated in FIG. 3A, however, if a characteristic (property) A in an area in the plane of the spatial light modulator 103 is different from a characteristic (property) B in another area, namely, if there exists an in-plane variation in on/off characteristic of the spatial light modulator 103, the intensity response of a light modulated by the spatial light modulator 103 will vary from one to another area with a result that an intensity recognized by the human eyes will vary. More particularly, if the spatial light modulator 103 varies in in-plane characteristic from one to another area, the light pulse intensity and shape, premises for intensity modulation through the pulse width modulation, will also vary from one to another in-plane area, so that the intensity will be nonuniform.

This problem can be solved with a completely uniform characteristic over the plane of the spatial light modulator 103. However, it is extremely difficult to have the complete uniformity of the characteristic over the plane of the spatial light modulator 103. Thus, it has been difficult with the conventional image displaying apparatus to eliminate the light intensity nonuniformity due to the nonuniform in-plane distribution of the characteristic of the spatial light modulator 103.

For a pulse width modulation for a limited period with an increased number of intensity levels, the minimum pulse width has to be reduced. In an ordinary image displaying apparatus, for example, the display period of one screen is about 16 msec for which a pulse width modulation should be done to realize a display with a gradation of light intensity. Under an assumption that a pulse width modulation is done for the period of 16 msec, if an intensity data is of 8 bits and has 256 intensity levels, the necessary minimum pulse width has to be 62 $\mu$sec. In case an intensity data is of 10 bits and has 1024 intensity levels, the minimum pulse width has to be 15 $\mu$sec.

More particularly, for display of ail image with a gradation of light intensity by a pulse width, modulation, the minimum pulse width should be several tens $\mu$sec. Since the TN liquid crystal and STN liquid crystal have a response speed of several msec to several hundreds $\mu$sec, the minimum pulse width cannot be several tens $\mu$sec. On the contrary, the light modulating material, such as FLC, can attain a minimum pulse width of several tens $\mu$sec. However, even if an light modulating material having a high response such as FLC is used, it is necessary to use a very high voltage to excite the light modulating material in order to have such a small minimum pulse width. Namely, the requirements for excitation of the light modulating material are very difficult to meet. Therefore, a pulse width modulation in the conventional image displaying apparatus using a spatial light modulator which provides a binary modulation of a light cannot provide a satisfactory display of an image with a gradation of light intensity.

SUMMARY OF THE INVENTION

Accordingly the present invention has an object to overcome the above-mentioned drawbacks of the prior art by providing an image displaying apparatus and method which can provide a satisfactory display of an image with a gradation of light intensity even with a spatial light modulator which provides a binary light or optical modulation.

The above object can be accomplished by providing an image displaying apparatus comprising, according to the present invention, a spatial light modulator having a plurality of pixels formed therein and modulating a light at each pixel thereof in a binary manner correspondingly to a pixel data of an image to be displayed; and a light source which is turned off during changing in state of a pixel formed in the spatial light modulator, and irradiates a light pulse to the spatial light modulator while the pixel state is steady; the light pulse from the light source being modulated by the spatial light modulator at each pixel to display the image.

The above object can also be accomplished by providing an image displaying method comprising the following steps, according to the present invention, of: modulating a light from a light source at each pixel of a spatial light modulator which modulates a light in a binary manner correspondingly to a pixel data of an image to be displayed; turning off the light source during changing in pixel state of the spatial light modulator; and irradiating a light pulse from the light source to the spatial light modulator while the pixel state of the spatial light modulator is steady.

According to the present invention, the light source is turned off while the pixel state in the spatial light modulator is being changed, and the light pulse is irradiated to the spatial light modulator when the pixel of the spatial light modulator is in the steady state. Namely, according to the present invention, no image is displayed while the pixel state in the spatial light modulator is being changed. Therefore, even if there exists an in-plane characteristio variation while the pixel state of the spatial light modulator is being changed, it will not cause any nonuniform intensity in an image to be displayed.

Also, according to the present invention, a light pulse irradiated to the spatial light modulator is modulated to provide a gradation of light intensity. Therefore, according to the present invention, a gradation of light intensity can be attained even with the spatial light modulator which cannot respond fast.

The human eyes integrate a quantity of light and recognize the integrated value as an intensity as will be seen from FIGS. 16A and 16B. Therefore, according to the present invention, the light pulse may be modulated with a consideration given only to the integrated value of the light pulse quantity, not to a pulse width, number of pulses, pulse intensity, pulse shape, pulse position, etc. That is to say, the quantity of the light pulse irradiated to the spatial light modulator may be adjusted through adjustment of the pulse width, number of light pulses, pulse intensity, pulse shape, etc. based on the product of a length of irradiation time and an irradiation intensity.

BRIEF DESCRIPTION OF THE DRAWINGS

These objects and other objects, feature and advantages of the present intention will become more a-apparent from the following detailed description of the preferred embodiments of present invention when taken in conjunction with the accompanying drawings, of which:

FIGS. 3A and 3B show together an intensity nonuniformity caused by an in-plane variation in characteristic of the spatial light modulator from one to another area, of which FIG. 3A showing areas different in characteristic of the spatial light modulator while FIG. 3B shows the relation between a response of the spatial light modulator and recognizable light intensity;

DETAILED DESCRIPTION OF THE PREFERRED EMBODIMENTS

Figure 1:
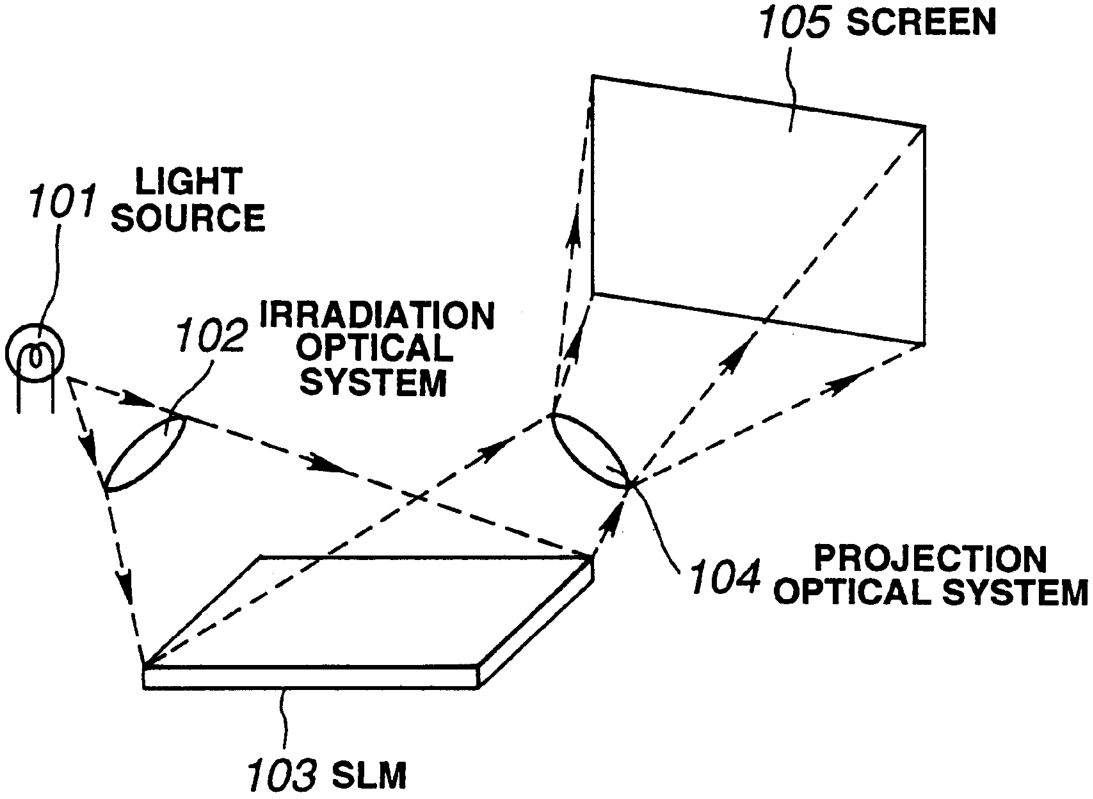
FIG. 1 is a concept drawing schematically illustrating the configuration of an image displaying apparatus.
Figure 2:
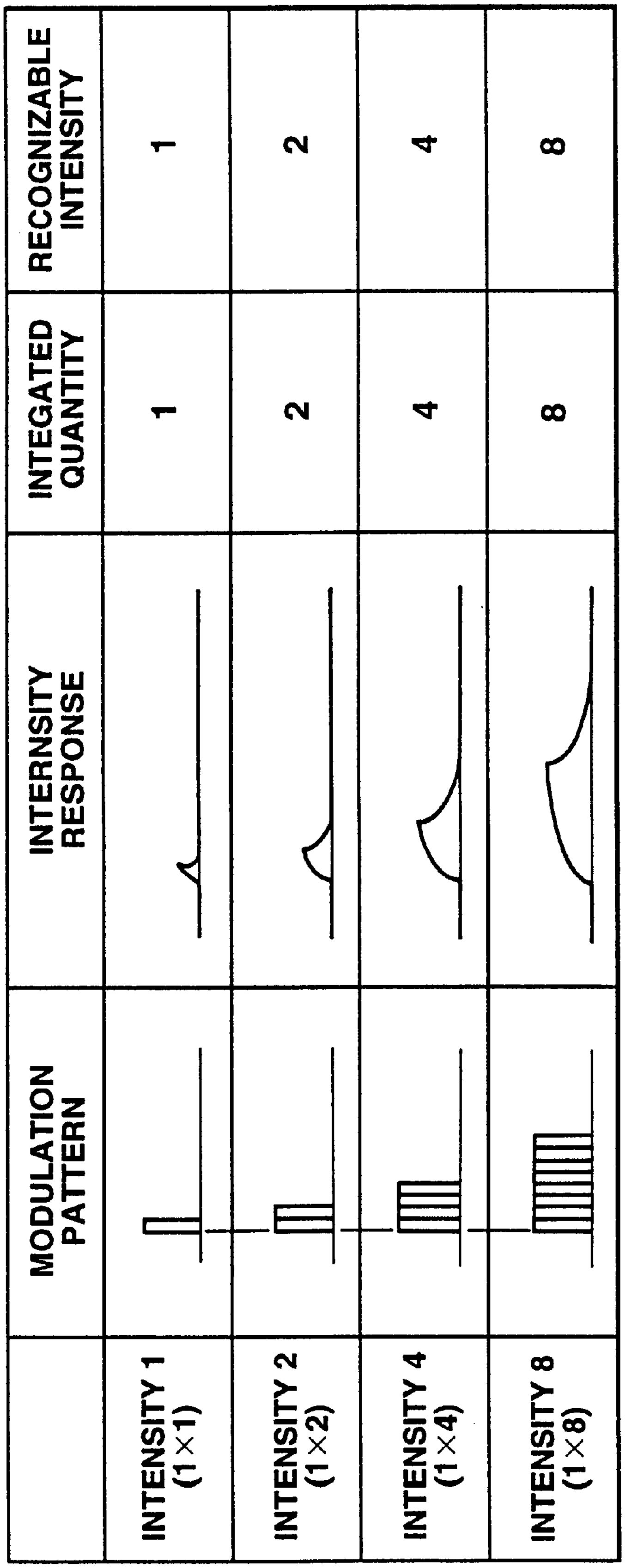
FIG. 2 is an explanatory drawing of the basic principle of a pulse width modulation effected in the above-mentioned image displaying apparatus to realize a display with a gradation of light intensity.
Figure 3A:
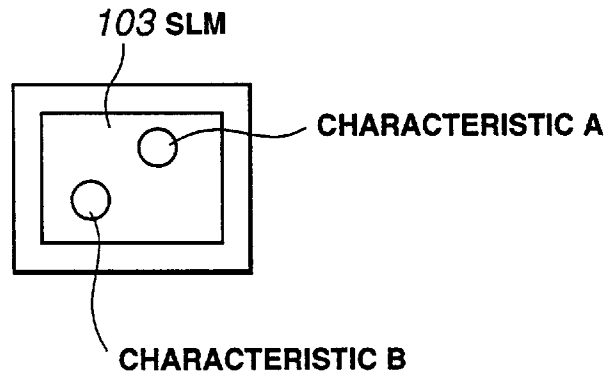
Figure 3B:
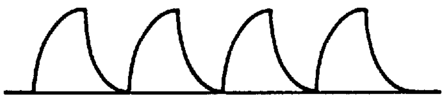
Figure 3B:
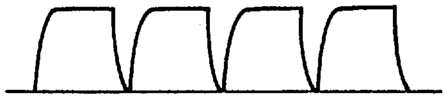
Figure 4:
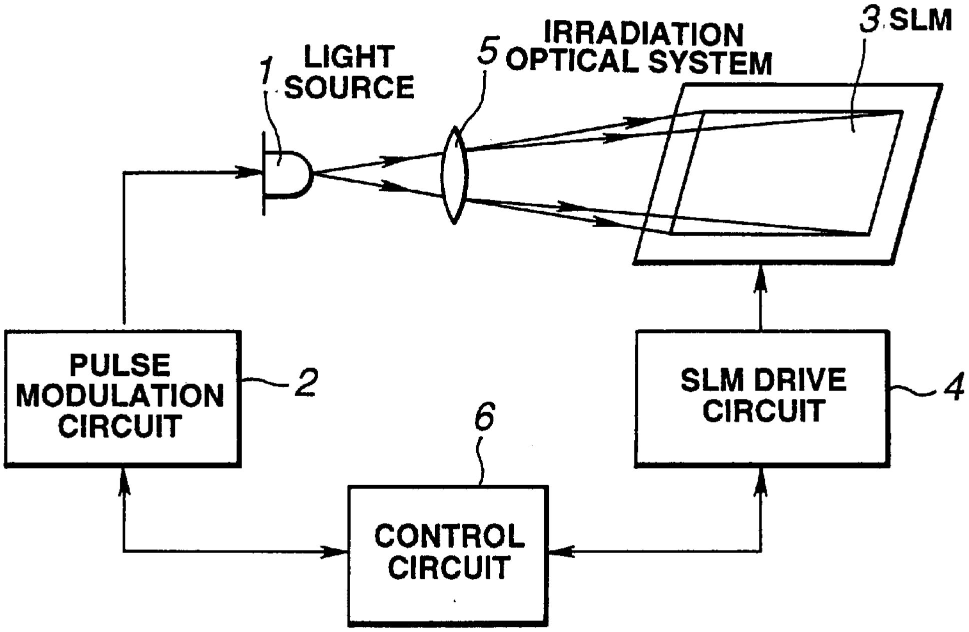
FIG. 4 shows an example of the configuration of the image displaying apparatus according to the present invention.

Referring now to FIG. 4, the first embodiment of image displaying apparatus according to the present invention is illustrated. The image displaying apparatus is destined for use as a display unit of a TV receiver, computer monitor, portable terminal, etc. As seen, it comprises a light source 1 to emit a light pulse, a pulse modulation circuit 2 to modulate the light pulse from the light source 1, a spatial light modulator 3 to modulate the light pulse from the light source 1 at each pixel thereof, a spatial light modulator drive circuit 4 to drive the spatial light modulator 3, a light-irradiation optical system 5 to irradiate the light pulse from the light source 1 to the spatial light modulator 3, a control circuit 6 to control the pulse modulation circuit 2 and spatial light modulator drive circuit 4, a screen (not illustrated in FIG. 4) onto which a light modulated by the spatial light modulator 3 is projected, and a light-projection optical system (not illustrated in FIG. 4) to project the light modulated by the spatial light modulator 3 onto the screen.

For displaying an image by the image displaying apparatus, data of the image is supplied to the control circuit 6. The control circuit 6 will control, based on the supplied image data, the pulse modulation circuit 2 and spatial light modulator drive circuit 4. The pulse modulation circuit 2 is controlled by the control circuit 6 to drive the light source 1 to emit a light pulse. On the other hand, the spatial light modulator drive circuit 4 is controlled by the control circuit 6 to drive the spatial light modulator 3.

Under the control of the pulse modulation circuit 2, the light source 1 emits a light pulse as mentioned above. More particularly, the light pulse from the light source 1 has the width, number, etc. thereof controlled by the pulse modulation circuit 2 as will be further discussed later. It should be appreciated that the light source 1 may be any one of a halogen lamp, metal halide lamp, xenon lamp, light emitting diode and the like. For a larger-screen image displaying apparatus, a halogen lamp, metal halide lamp, xenon lamp or the like is suitable for use since it provides a sufficient quantity of light. Also, for the image displaying apparatus to be used in a portable terminal, a light emitting diode is suitable for use as the light source 1 since it can conveniently meet a requirement for a smaller screen and lower power consumption.

For display of a color image, the light source 1 should be a one which can emit red, green and blue light pulses corresponding to the three primary colors of a light and should be time-shared for display of an image with red, green and blue light pulses. For red, green and blue light pulses corresponding to the three primary colors, three independent light sources may be used for the respective colors. Alternatively, a light pulse from one light source may be divided by a dichroic mirror or the like into red, green and blue light pulses.

The light pulse emitted from the light source 1 is irradiated to the spatial light modulator 3 through the light-irradiation optical system 5. The light pulse is modulated at each pixel of the spatial light modulator 3. This spatial light modulator 3 is made of an light modulating material capable of working fast, such as FLC, to have a plurality of pixels formed therein. The spatial light modulator 3 is driven by the drive circuit 4 to modulate a light at each pixel thereof in a binary manner correspondingly to a pixel data of an image to be displayed. Thereafter, the light modulated at each pixel and reflected by the spatial light modulator 3 is projected onto the screen through the light-projection optical system, so that the image is displayed on the screen.

It should be noted that the spatial light modulator 3 may be of either a reflection type or a transmission type as previously mentioned. The spatial light modulator of the reflection type can be designed that a memory element or the like for driving the spatial light modulator at each pixel thereof is disposed at the opposite side to the light reflecting surface with the memory element not limiting the effective aperture of the pixel. Namely, in the reflection-type spatial light modulator, the effective aperture of each pixel can be increased. On the other hand, since the lighlt-irradiation and light-projection optical systems may be omitted from the transmission-type spatial light modulator, the image displaying apparatus can be designed to have a thinner structure. More particularly, the image displaying apparatus can be thinned very much by disposing a backlight at the back of the transmission-type spatial light modulator and displaying an image with a light having gone out of the backlight and passed through the spatial light modulator.

According to the present invention, the light source 1 is turned off during changing in state of a pixel formed in the spatial light modulator 3, and a light pulse from the light source 1 is irradiated to the spatial light modulator 3 when the state of a pixel formed in the spatial light modulator 3 is steady. To realize the above, the pulse modulation circuit 2 is connected to the light source 1 in the image displaying apparatus illustrated in FIG. 4 so that the light pulse outgoing from the light source 1 is modulated by the pulse modulation circuit 2. In the present invention, however, the turn-off of the light source 1 does mean that the light from the light source 1 will not reach the human eyes watching an image being displayed but not that the light source 1 has to be turned on actually.

Figure 5:
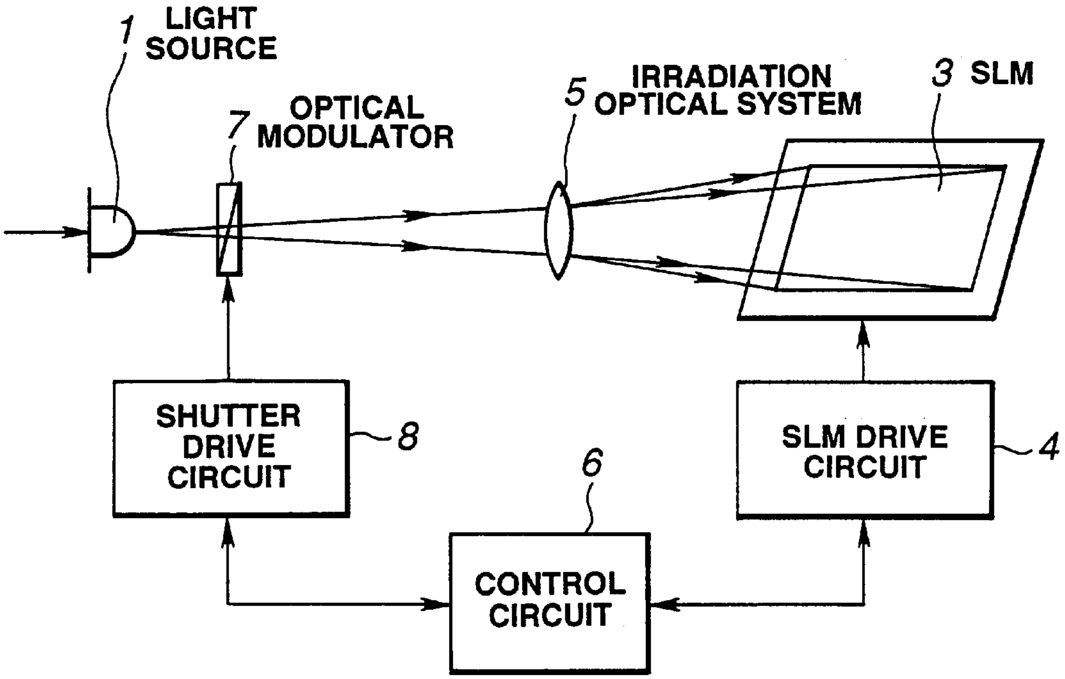
FIG. 5 shows another example of the configuration of the image displaying apparatus according to the present invention.

To this end, an optical or light modulator 7 acting as a light shutter may be disposed between the light source 1 and light-irradiation optical system 5, and a shutter drive circuit 8 to control the operation of the optical modulator 7 be provided in place of the pulse modulation circuit 2, as illustrated in FIG. 5. In this case, the optical modulator 7 shapes into a pulse the light emitted from the light source 1 and incident upon the spatial light modulator 3. By controlling the open-closing timing of the optical modulator 7 by the shutter drive circuit 8, the light pulse irradiated to the spatial light modulator 3 is controlled as to its width, number, etc. Note that a mechanical shutter may be used as the optical modulator 7 but that an optical modulator using an acousto-optic modulation element (AOM) and needing no mechanism operation is suitable for the optical modulator 7.

Next, how a display with a gradation of light intensity is implemented using the image displaying apparatus having been described in the foregoing will be discussed herebelow. Note that the "intensity levels" will be referred to simply as "levels" hereafter and that a level data per pixel is of 4 bits. A display with 16 levels will be described by way of example.

In the following description, a display period of one image to be displayed with 16 levels will be taken as one field. In the conventional image displaying apparatus, the one field is of 16 msec. One image having the 16 levels is comprised of at least four kinds of images different in intensity from one another. Such an image is called a "bit plane". A display period of one bit plane is called a "subfield". That is to say, one image having 16 levels consists of at least four bit planes. When one image having 16 levels consists of four bit planes, one field consists of four subfields.

Figure 6:
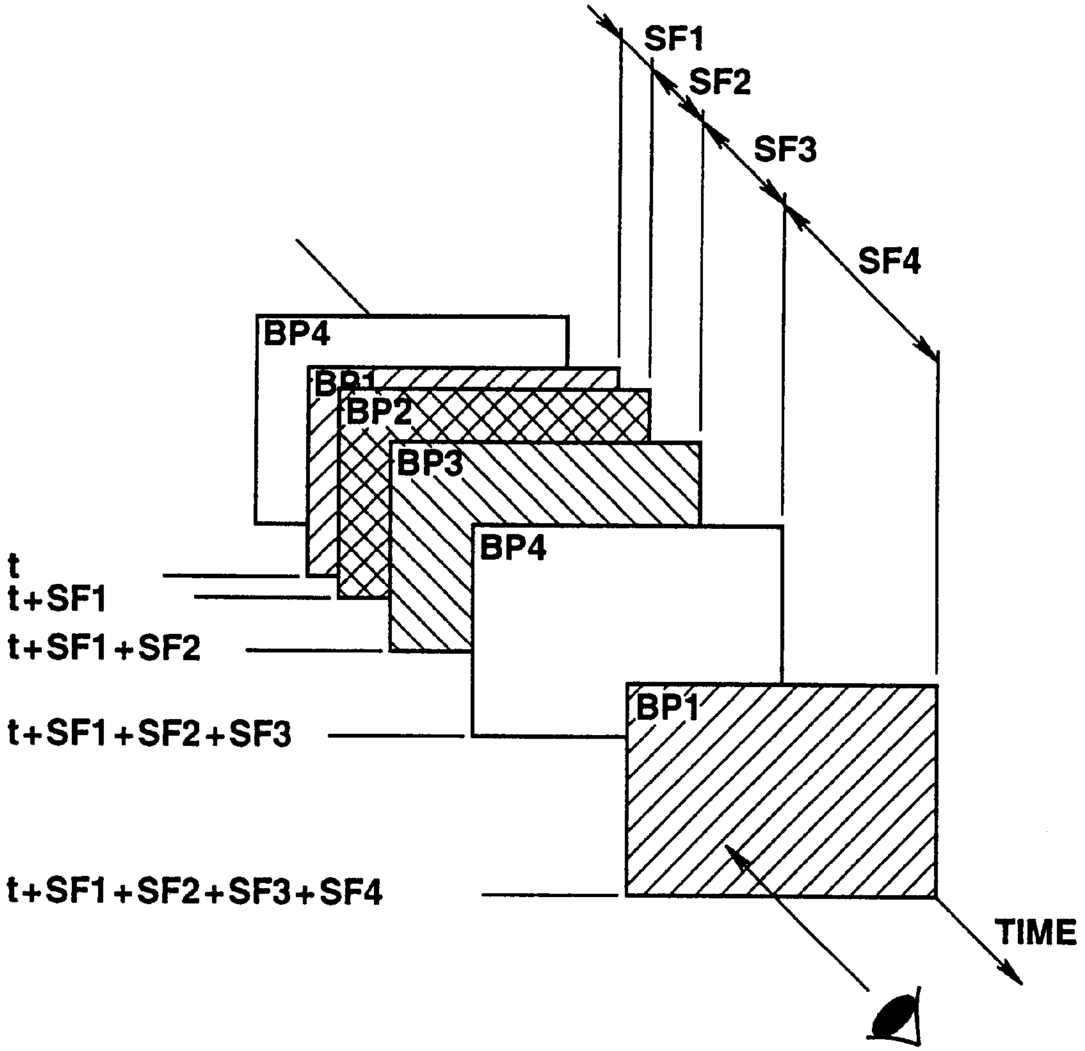
FIG. 6 shows how the first to fourth bit planes are displayed sequentially during display of an image of which the intensity is displayed with 16 intensity levels.

For display of an image having 16 levels, a first bit plane BP1 is first displayed at a time point t in a period of a first sub-field SF1 as shown in FIG. 6. Next, a second bit plane BP2 is displayed at a time point t+SF1 in a period of a second sub-field SF2. Then, a third bit plane BP3 is displayed at a time point t+SF1+SF2 in a period of a third sub-field SF3. Next, a fourth bit plane BP4 is displayed at a time point t+SF1+SF2+SF3 for a period of a fourth sub-field SF4. After the bit planes BP1 to BP4 are displayed, bit planes of a next image will be displayed sequentially again.

It is now assumed that the time ratio between the sub-fields is SF1:SF2:SF3:SF4=1:2:4:8. Thus, the first bit plane BP1 is displayed as an image of which the intensity level recognizable by the human eyes is 1. With the second, third and fourth bit planes, such levels are 2, 4 and 8, respectively. By superposing these bit planes, an image can be displayed with 16 levels. Namely, when these four bit planes BP1, BP2, BP3 and BP4 are displayed continuously, the human eyes will recognize an image displayed with 16 levels under the afterimage effect.

Figure 7A:
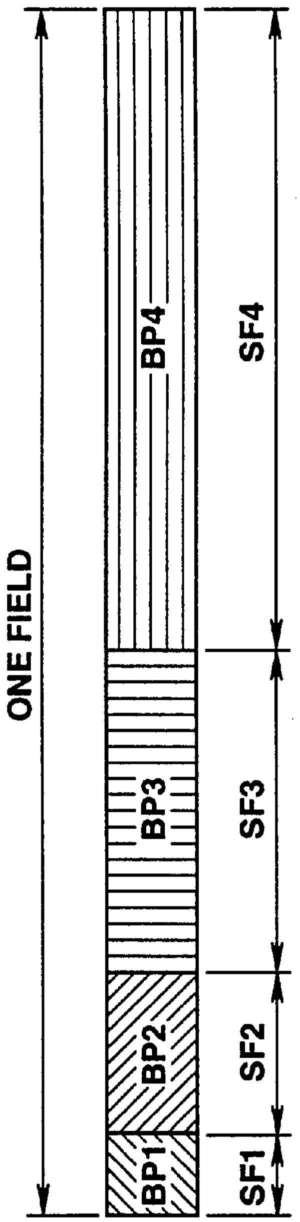
FIG. 7A shows how one image having 16 intensity levels is displayed with four bit planes.
Figure 7B:
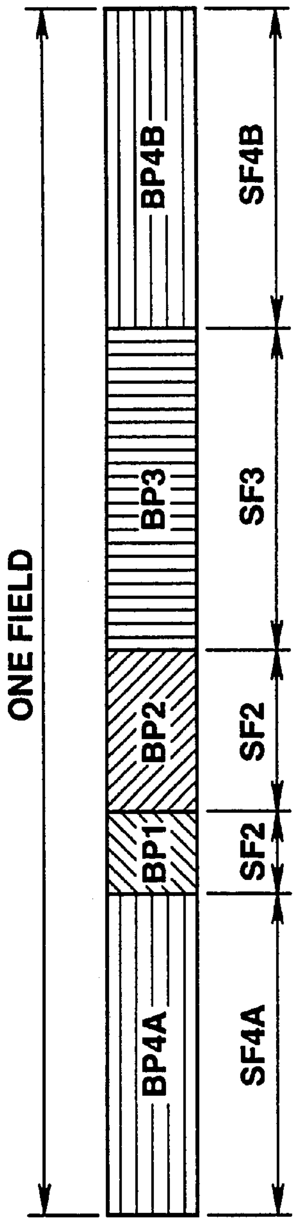
FIG. 7B shows how one image having 16 intensity levels is displayed with five bit planes.
Figure 7C:
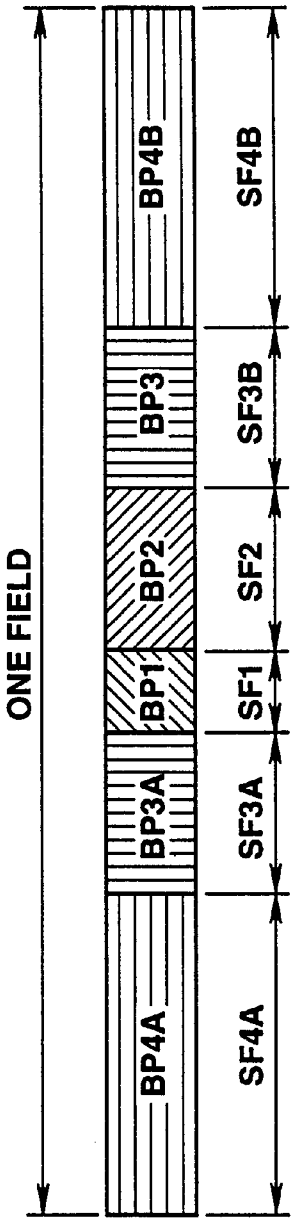
FIG. 7C shows how one image having 16 intensity levels is displayed with six bit planes.

In the above, an example in which an image having 16 levels is composed of four bit planes has been discussed. However, it should be appreciated that one image having 16 levels may be composed of five or more bit planes. Namely, in the above-mentioned example, one field is divided into four sub-fields SF1, SF2, SF3 and SF4 and bit planes BP1, BP2, BP3 and BP4 are displayed in each sub-field, as illustrated in FIG. 7A. However, these sub-fields and bit planes may be further sub-divided as illustrated in FIGS. 7B and 7C. It should be noted that the numbers of the sub-fields and of the bit planes and the arranged orders of the sub-fields and the bit planes are not limited to those in the above example illustrated in FIGS. 7A, 7B and 7C, but may be freely set.

In the example illustrated in FIG. 7B, the fourth bit plane BP4 is further divided into bit planes BP4A and BP4B, and the fourth sub-field for which the fourth bit plane BP4 is displayed is subdivided into sub-fields SF4A and SF4B. The sub-fields are arranged in an order of SF4A, SF1, SF2, SF3 and SF4B, and the bit planes are displayed in an order of BP4A, BP1, BP2, BP3 and BP4B.

In the example illustrated in FIG. 7C, the third bit plane BP3 is further divided into bit planes BP3A and BP3B, and the fourth bit plane BP4 is subdivided into bit planes BP4A and BP4B. Also, the third sub-field SF3 for which the third bit plane BP3 is displayed is subdivided into sub-fields SF3A and SF3B, and the fourth sub-field for which the fourth bit plane BP4 is displayed is subdivided into sub-fields SF4A and SF4B. The sub-fields are arranged in an order of SF4A, SF3A, SF1, SF2, SF3B and SF4B while the bit planes are displayed in an order of BP4A, BP3A, BP1, BP2, BP3B and BP4B.

Conventionally for a display with a gradation of intensity as mentioned above, the light source is always kept illuminated with a predetermined intensity and the spatial light modulator is driven at a high speed to adjust the intensity of each bit plane, namely, the displaying period of each bit plane. On the contrary, according to the present invention, emitted from the light source 1 is pulsed and subjected to a pulse modulation to adjust the intensity. How the light from the light source 1 is pulsed and displayed as an image will be discussed in detail below.

Figure 8:
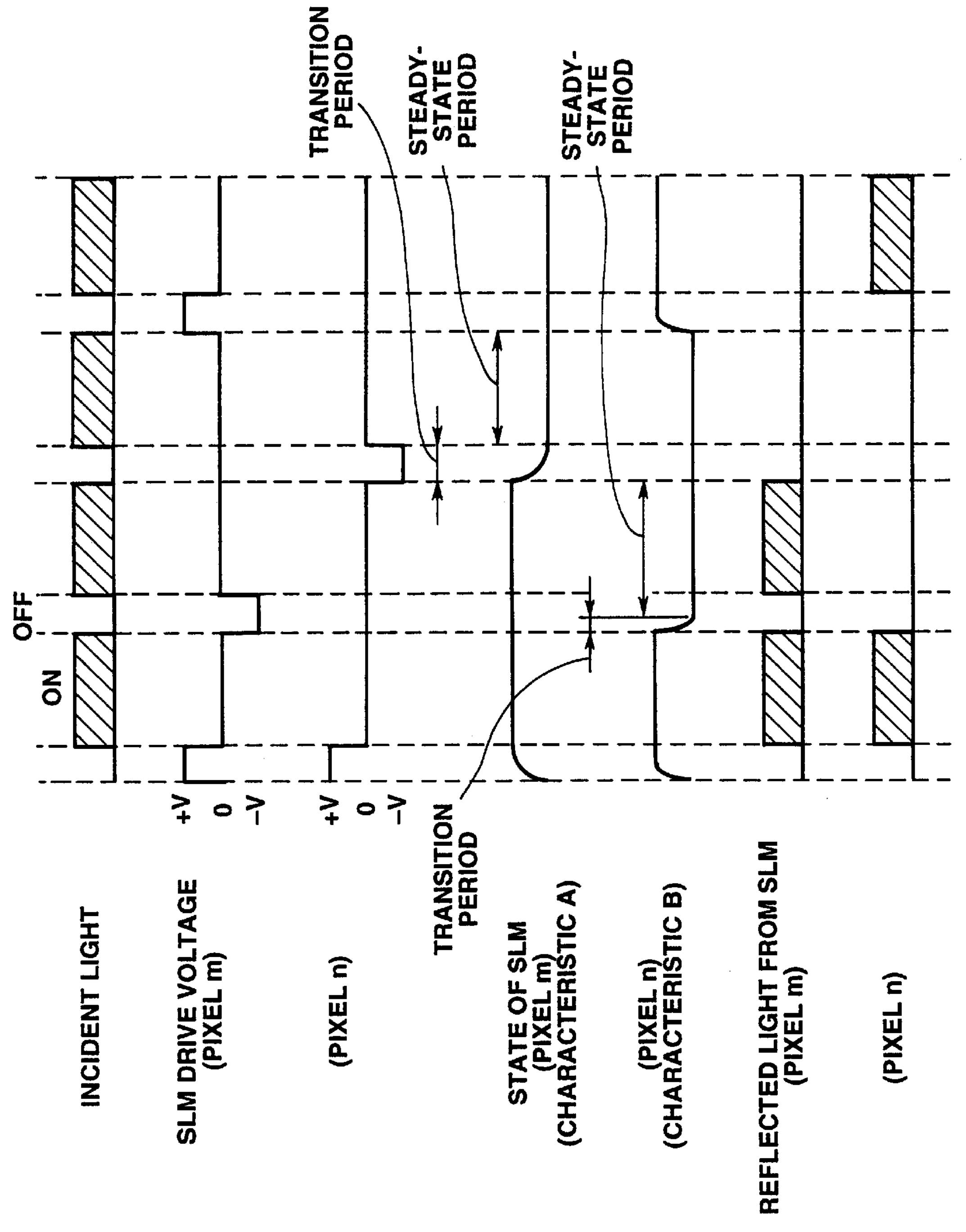
FIG. 8 is a timing chart for explanation of how the spatial light modulator is driven with its in-plane characteristic variation improved, illustrating how the light source is turned off during changing in pixel state and on only when the pixel state is steady.

According to the present invention, the light source is turned off during changing of pixel state and turned on only when the pixel state is steady. This is illustrated in FIG. 8. In this example, the spatial light modulator 3 is of a reflection type using a light modulating material having a state memorizing characteristic. Namely, it suffices to apply a driving voltage when a pixel is rewritten and thereafter the pixel state is maintained even with the driving voltage made zero.

In the time chart illustrated in FIG. 8, two pixels m and n are illustrated by way of example. FIG. 8 shows time changes of a light irradiated from the light source, a driving voltage applied to the spatial light modulator 3 to change the state of the pixel m, a driving voltage applied to the spatial light modulator 3 to change the state of the pixel n, a state of a portion of the spatial light modulator 3 for the pixel m, a state of a portion of the spatial light modulator 3 for the pixel n, a reflected light from the pixel m of the spatial light modulator 3, and a reflected light from the pixel n of the spatial light modulator 3.

As seen FIG. 8, the light source 1 is turned off during the period (transition period) for which the pixels m and n are changed in state. The light source 1 is turned on only for a period (steady-state period) for which all the pixels m and n are in their steady states.

Normally, the characteristics of all the pixels of the spatial light modulator are not uniform but the response characteristics of them vary in plane from one to another area. Therefore, if the spatial light modulator is applied with a same driving voltage to the different pixels m and n thereof, the pixels m and n may possibly respond in different manners as the case may be. Namely, even if the pixels m and n are applied with a same driving voltage, they will possibly be different in state from each other. Therefore, when an image is displayed during the transition period, an intensity nonuniformity will take place.

According to the present invention, the light source 1 is turned off for the transition period so that no image is displayed. Therefore, even if the pixel m responds in a different manner from the pixel n during the transition period, such a difference will not have any influence on image display. Thus, even if there takes place any in-plane characteristic variation in the spatial light modulator 3, an image free from intensity nonuniformity and having an outstanding quality can be displayed.

Further, according to the present invention, only when the pixel state is steady, the light pulse irradiated to the spatial light modulator 3 can be modulated to implement a display with many levels. The pulse modulation will be described below with reference to eight embodiments of the present invention.

It should be appreciated that in the following embodiments, the aforementioned four bit planes BP1, BP2, BP3 and BP4 will be used for a display with 16 levels. That is to say, the first bit plane BP1 of which the intensity level recognizable by the human eyes is 1 is displayed for the first sub-field SF1. The second bit plane BP2 of which the intensity level recognizable by the human eyes is 2, is displayed for the second sub-field SF2. The third bit plane BP3 of which the intensity level recognizable by the human eyes is 4 is displayed for the third sub-field SF3. The fourth bit plane BP4 of which the intensity level recognizable by the human eyes is 8 is displayed for the fourth sub-field SF4.

Also in the embodiments of the present invention which will be further discussed below, a display with 16 levels of intensity, this number of levels being relatively small, will be described. However, the present invention can of course be applied to a display with more or less levels. Particularly, the present invention is advantageous in that an image can be displayed with an increased number of levels even without any fast response of the spatial light modulator 3. For example, eight bits of level data can be assigned to each pixel of the spatial light modulator 3 to display an image with 256 levels. Further, ten such bits can be assigned to each pixel to display an image with 1024 levels. These can be easily implemented.

In the following embodiments, the four bit planes of one image having 16 levels are referred to for the simplicity of description and illustration. It should also be appreciated, however, that according to the present invention, one image having 16 levels can of course be composed of five or more bit planes as seen from FIG. 7.

First Embodiment

Figure 9:
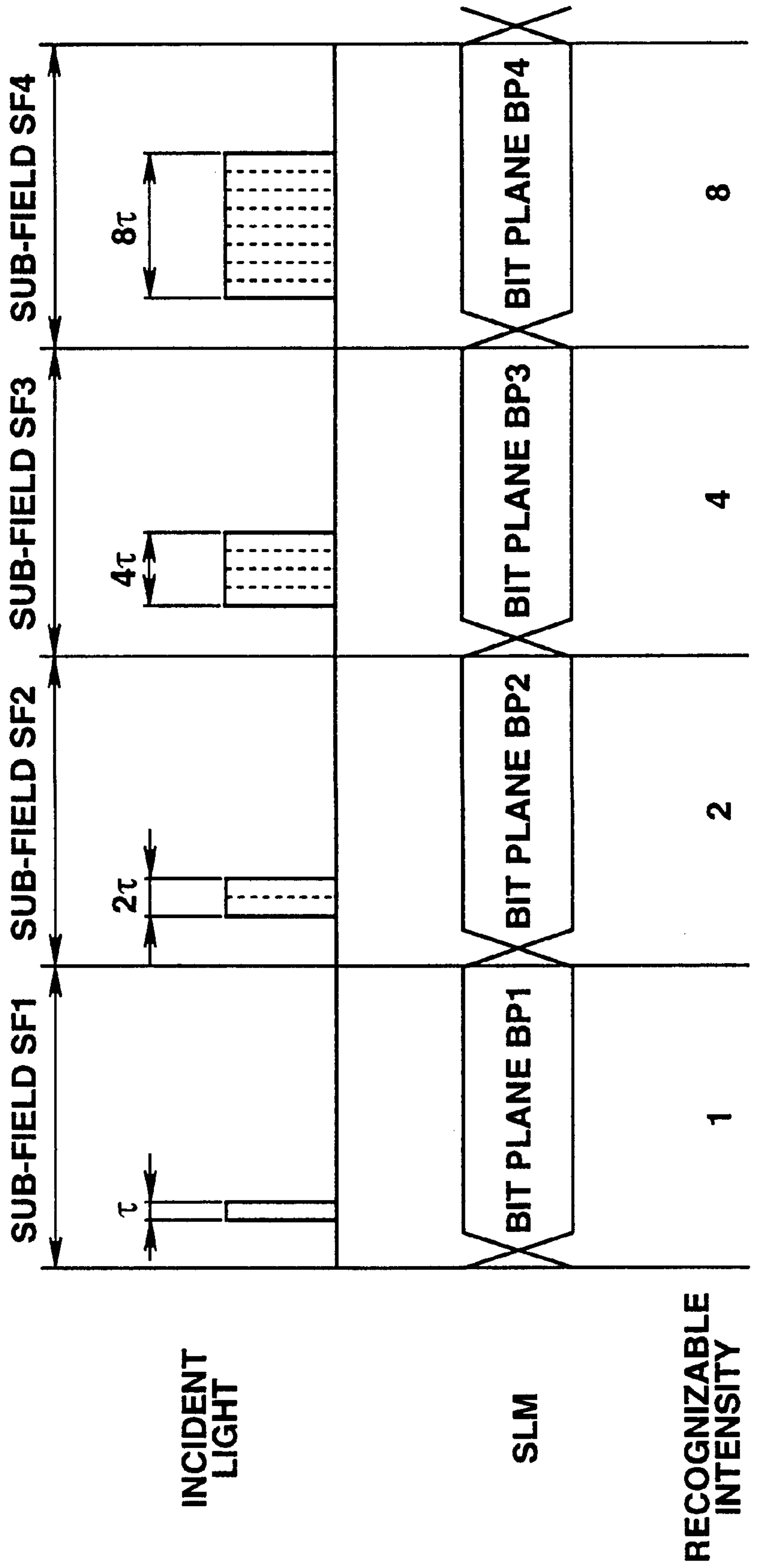
FIG. 9 is an explanatory drawing of a first embodiment of the present invention, showing the relation among a light pulse irradiated from a light source, state of display by the spatial light modulator, and an intensity level recognizable by the human eyes.

According to this embodiment, all the sub-fields are set to have a same length of period and a light pulse from the light source is subjected to a pulse width modulation, as shown in FIG. 9.

Figure 10:
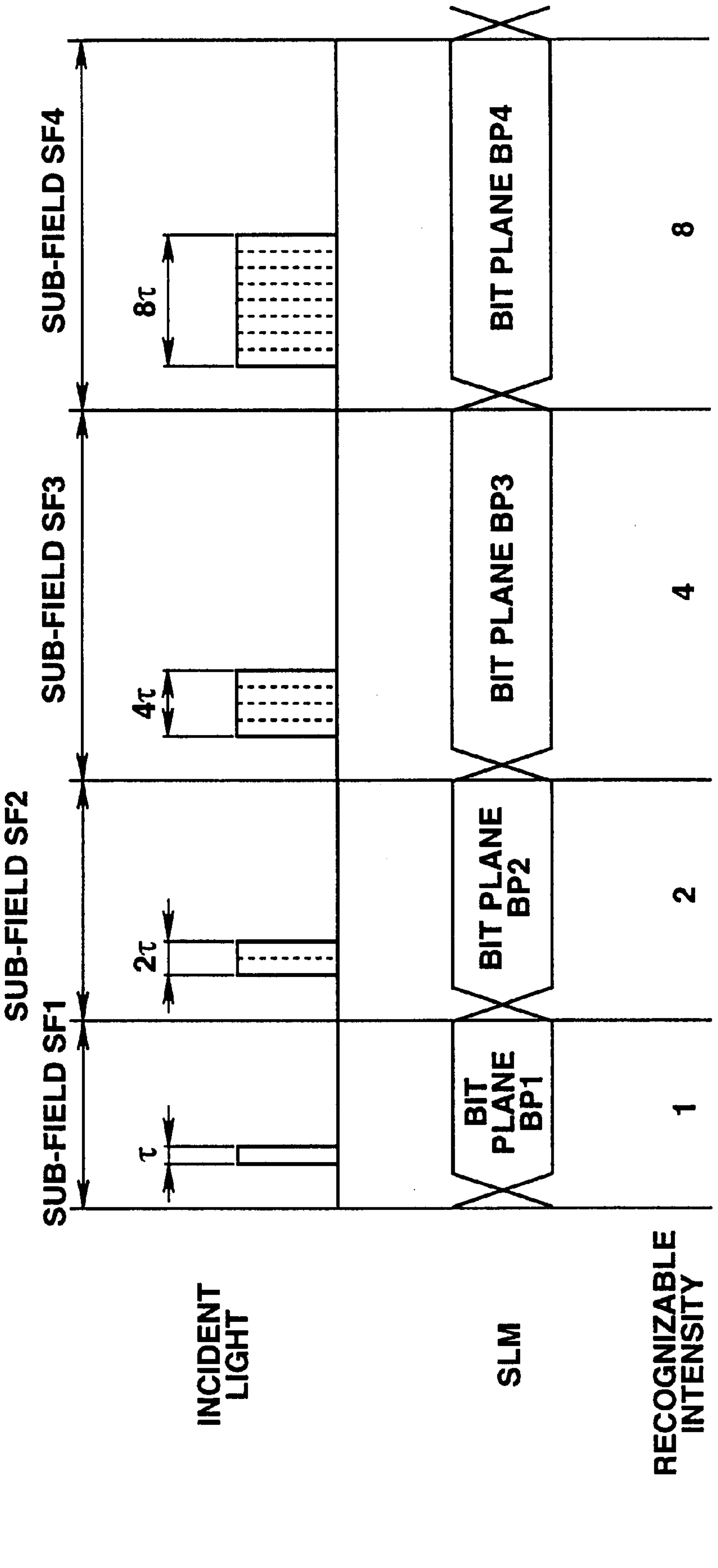
FIG. 10 is an explanatory drawing of a second embodiment of the present invention, showing the relation between a light pulse irradiated from a light source to the spatial light modulator, state of display by the spatial light modulator, and an intensity level recognizable by the human eyes.

It should also be noted that the light pulse is modulated with the light source 1 turned on and off by the pulse modulation circuit 2 at a predetermined timing in the image displaying apparatus as illustrated in FIG. 10. Also, in the image displaying apparatus in FIG. 6, the light pulse modulation is done with the on-off timing of the optical modulator 7 controlled by the shutter drive circuit 8. The above is also true for the second to seventh embodiments which will be described following the explanation of the first embodiment.

As illustrated in FIG. 9, a light pulse modulated to have a width corresponding to each bit plane is irradiated from the light source 1 to the spatial light modulator 3 for the period of each sub-field in the first embodiment. Namely, the light pulse irradiated to the spatial light modulator 3 is modulated to have a width $\tau$ for the first sub-field SF1. The pulse width of the irradiated light pulse for the second sub-field SF2 is $2\times\tau$, that of the irradiated light pulse for the third sub-field SF3 is $4\times\tau$, and that for the fourth sub-field SF4 is $8\times\tau$.

As results of the above modulations, the level of the first bit plane BP1 recognizable by the human eyes is 1, that of the second bit plane BP2 is 2, that of the third bit plane BP3 is 4, and that of the fourth bit plane is 8. As aforementioned, these bit planes BP1, BP2, BP3 and BP4 are superposed one on the other to display an image with 16 levels.

To increase the number of levels used for display of an image, it is necessary to increase the number of bit planes displayed for one field. To attain a same purpose in the conventional image displaying apparatus, the period of the sub-fields should be decreased to increase the number bit planes. Since the response speed of the spatial light modulator is limited, however, decreasing the sub-field period is also limited. Thus, it was difficult to increase the number of levels for use in image display in the conventional image displaying apparatus.

On the other hand, according to this embodiment, the light pulse is modulated to change the level of each bit plane irrespectively of the length of period of the sub-field. Thus, even when a sufficient length of the sub-field period is secured for the operation of the spatial light modulator 3, it is possible to increase the number of bit planes different in intensity level. Therefore, according to the present invention, it is possible to display an image with much more levels than ever.

Second Embodiment

According this embodiment, the period of a sub-field is changed while the light pulse from the source 1 is subjected to a pulse width modulation as illustrated in FIG. 10.

More particularly, the periods of the first sub-field SF1 and second sub-field SF2 are set t1, the periods of the third and fourth sub-fields SF3 and SF4 are set two times longer than those of the first and second sub-fields SF1 and SF2, namely, $2\times t1$. Within these periods different in length, a light pulse modulated to have a width corresponding to each bit plane is irradiated from the light source 1 to the spatial light modulator 3.

Furthermore, for the first sub-field SF1, the light pulse irradiated to the spatial light modulator 3 is modulated to have a width $\tau$. For the second sub-field SF2, it is modulated to have a width $2\times\tau$. For the third sub-field SF3, it is modulated to have a field $4\times\tau$. For the fourth sub-field SF4, it is modulated to have a width $8\times\tau$. As the result of the above pulse modulation, the level of the first bit plane BP1 recognizable by the human eyes is 1, that of the second bit plane BP2 is 2, that of the third bit plane BP3 is 4, and that of the fourth bit plane BP4 is 8. As having previously been described, an image is displayed with 16 levels by superposing the bit planes BP1 to BP4 one on the other.

As illustrated in FIG. 10, the length of period of the sub-field is changed to decrease the off period of the light source for a bit plane for which a light pulse having a small width is irradiated from the light source 1, thus permitting to utilize the light with a higher efficiency. Because of the reduced off period, an image flickering due to pulsation of the light from the source 1 can be suppressed.

Note that the ratio in length of period between the sub-fields is not limited to the above example, but may be freely set.

Third Embodiment

Figure 11:
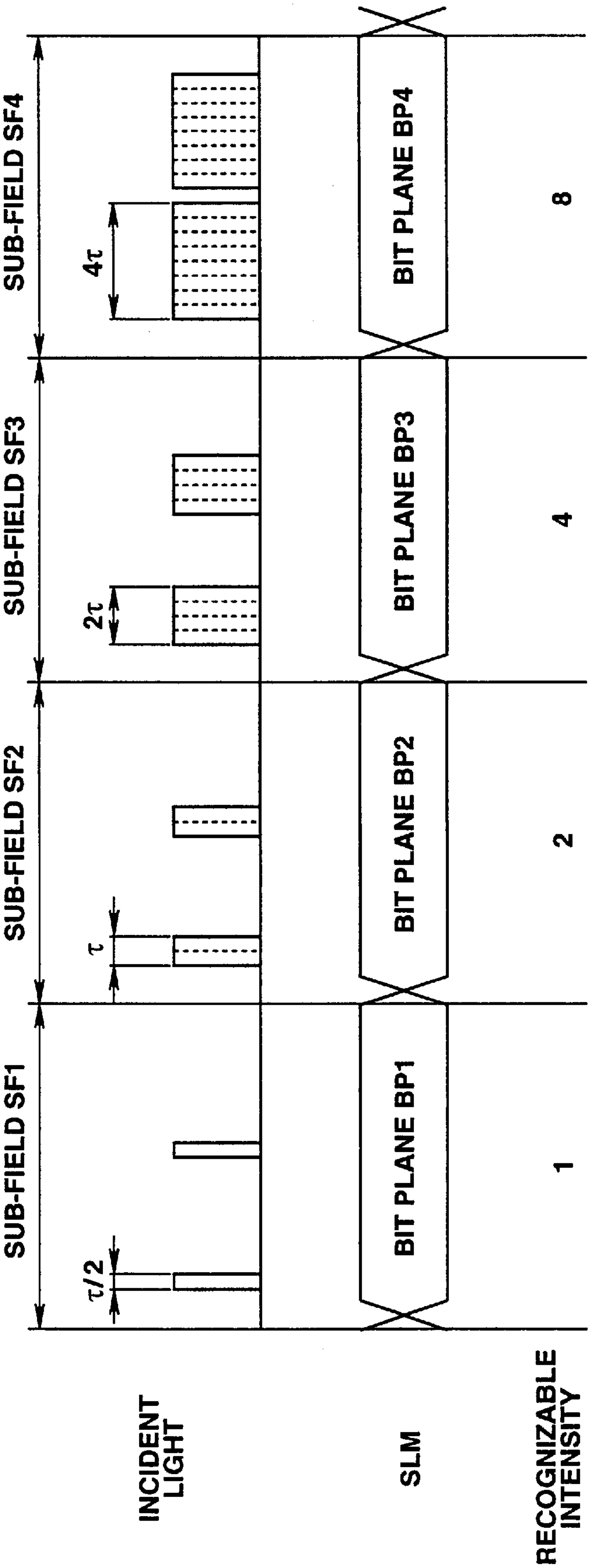
FIG. 11 is an explanatory drawing of a third embodiment of the present invention, showing the relation between a light pulse irradiated from a light source to the spatial light modulator, state of display by the spatial light modulator, and an intensity level recognizable by the human eyes.

According this embodiment, all the sub-fields are set to have a same length of period, the light pulse from the source 1 is subjected to a pulse width modulation, and two light pulses are emitted from the source 1 for one sub-field, as illustrated in FIG. 11. Namely, according to the present invention, two light pulses modulated to have a width corresponding to bit planes within the period of each sub-field are emitted from the source 1 to the spatial light modulator 3.

More particularly, for the first sub-field SF1, a light pulse having a width $\tau/2$ is irradiated two time points to the spatial light modulator 3 at a predetermined interval, as shown in FIG. 11. For the second sub-field SF2, a light pulse having a width $\tau$ is irradiated twice to the spatial light modulator 3 at the predetermined interval. For the third sub-field SF3, a light pulse having a width $2\times\tau$ is irradiated twice to the spatial light modulator 3 at the predetermined interval. For the fourth sub-field SF4, a light pulse having a width $4\times\tau$ is irradiated twice to the spatial light modulator 3 at the predetermined interval.

As the results of the above pulse modulation, the level of the first bit plane BP1 recognizable by the human eyes is 1, that of the second bit plane BP2 is 2, that of the third bit plane BP3 is 4, and that of the fourth bit planre BP4 is 8. As having previously been described, an image is displayed with 16 levels by superposing the bit planes BP1 to BP4 one on the other.

As illustrated in FIG. 11, a light pulse is irradiated to the spatial light modulator 3 more than once within one sub-field period to reduce the period for which the light source 1 is continuously off, thus the sub-field period can be used effectively. Since the continuous off peiriod is reduced, image flickering due to the pulsation of the light from the source 1 can be suppressed.

In the embodiment illustrated in FIG. 11, the light pulse is emitted twice within one sub-field period. However, it should be appreciated that the light pulse may be emitted more than three times within one sub-field period if the light source 1 can be turned on and off at a sufficiently high speed.

Fourth Embodiment

Figure 12:
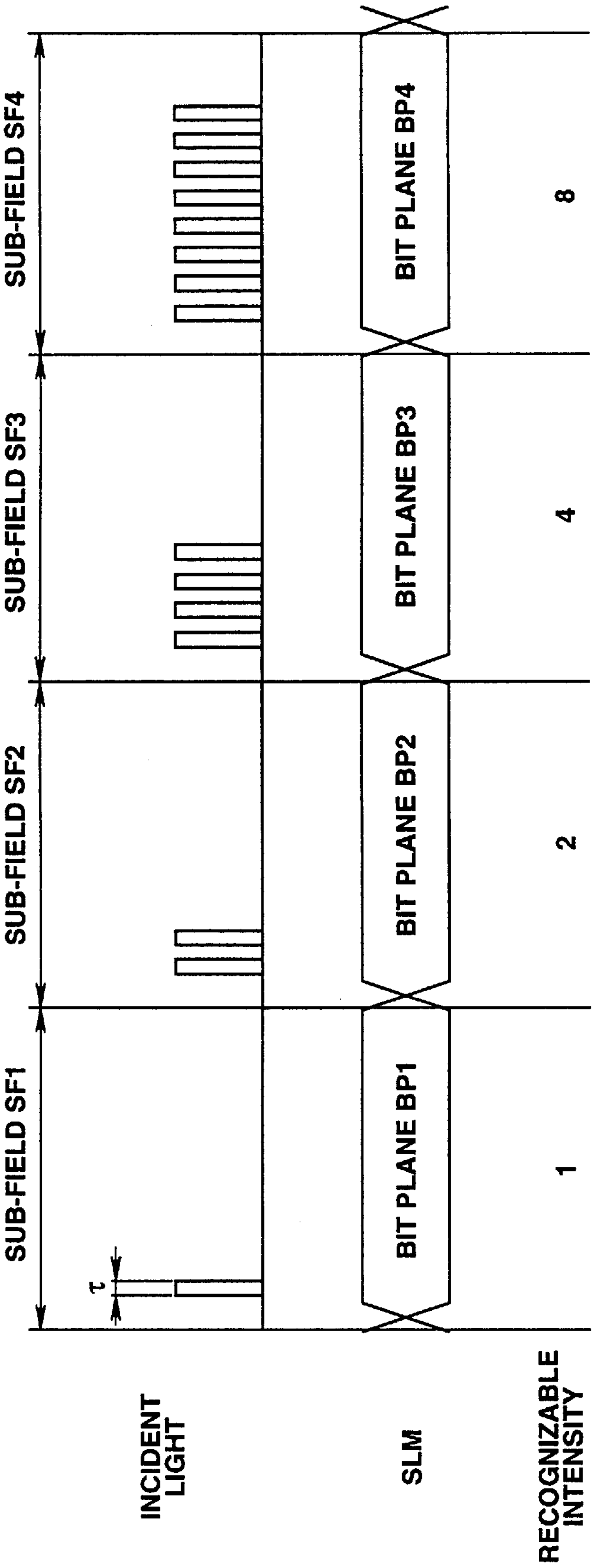
FIG. 12 is an explanatory drawing of a fourth embodiment of the present invention, showing the relation between a light pulse irradiated from a light source to the spatial light modulator, state of display by the spatial light modulator, and an intensity level recognizable by the human eyes.

According to this embodiment, all the sub-fields are set to have a same period to change the number of light pulses irradiated to the spatial light modulator 3 for the period of each sub-field as illustrated in FIG. 12.

More particularly, for the first sub-field SF1, a light pulse having width τ is irradiated once to the spatial light modulator 3, as illustrated in FIG. 12. For the second sub-field SF2, a light pulse having width τ is irradiated twice at a predetermined interval. For the third sub-field SF3, a light pulse having a width τ is irradiated 4 times at the predetermined interval. For the fourth sub-field SF4, a light pulse having a width τ is irradiated 8 times at the predetermined interval.

As the results of the above pulse modulation, the level of the bit plane BP1 recognizable by the human eyes is 1. That of the bit plane BP2 is 2, that of the bit plane BP3 is 4 and that of the bit plane BP4 is 8. As having been described in the foregoing, an image is displayed with 16 levels by superposing the bit planes BP1 to BP4 one on the other.

In this fourth embodiment and the fifth to eighth embodiments which will be discussed later, only the number of pulses is changed within one field period while the pulse width is kept unchanged. This pulse modulation is advantageous in its more accurate modulation than the pulse width modulation.

Fifth Embodiment

Figure 13:
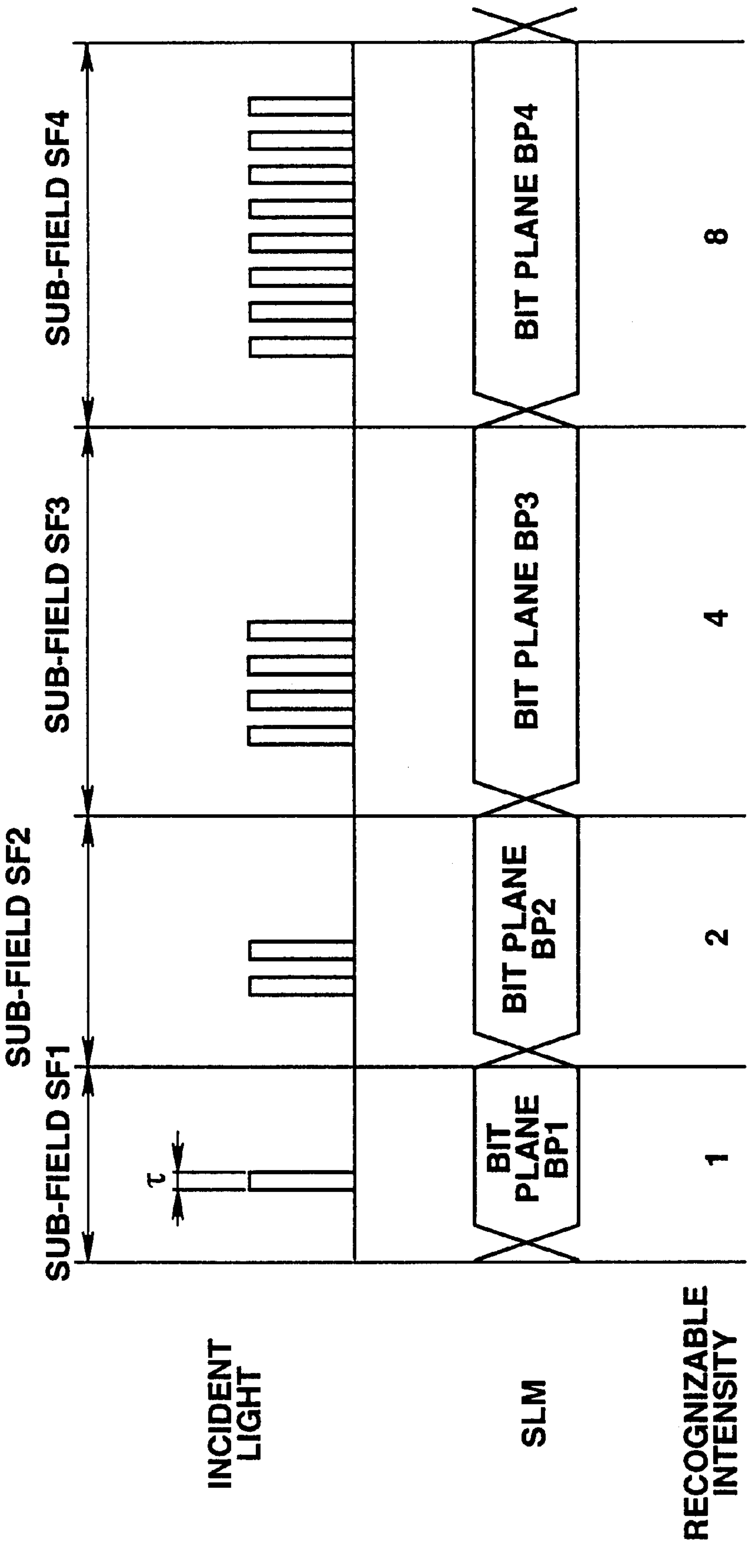
FIG. 13 is an explanatory drawing of a fifth embodiment of the present invention, showing the relation between a light pulse irradiated from a light source to the spatial light modulator, state of display by the spatial light modulator, and an intensity level recognizable by the human eyes.

According to this embodiment, the sub-field period is changed while the number of light pulses irradiated to the spatial light modulator is changed for each sub-field period, as illustrated in FIG. 13.

That is to say, the periods of the first and second sub-fields SF1 and SF2 are set t1, and those of the third and fourth sub-fields SF3 and SF4 are set double that of the first and second sub-fields SF1 and SF2, namely, 2×t1. For each sub-field period, the number of light pulses irradiated from the light source 1 to the spatial light modulator 3 is changed.

More particularly, for the first sub-field SF1, a light pulse having a width τ is irradiated once to the spatial light modulator 3. For the second sub-field SF2, a light pulse having a width τ is irradiated twice to the spatial light modulator 3 at a predetermined interval. For the third sub-field SF3, a light pulse having a width τ is irradiated 4 times to the spatial light modulator 3. For the fourth sub-field SF4, a light pulse having a width τ is irradiated 8 times to the spatial light modulator at the predetermined interval.

As the results of the above pulse modulation, the level of the first bit plane BP1 recognizable by the human eyes is 1, that of the second bit plane BP2 is 2, that of the third bit plane BP3 is 4, and that of the fourth bit plane BP4 is 8. As aforementioned, these bit planes BP1, BP2, BP3 and BP4 are superposed one on the other to display an image with 16 levels.

As illustrated in FIG. 13, the length of the sub-field is changed to decrease the off period of the light source for a bit plane for which a small number of light pulses is irradiated from the light source 1, thus permitting to utilize the light with a higher efficiency. Because of the reduced off period, an image flickering due to pulsation of the light from the source 1 can be suppressed.

Note that the ratio in length of period between the sub-fields is not limited to the above example, but may be freely set.

Sixth Embodiment

Figure 14:
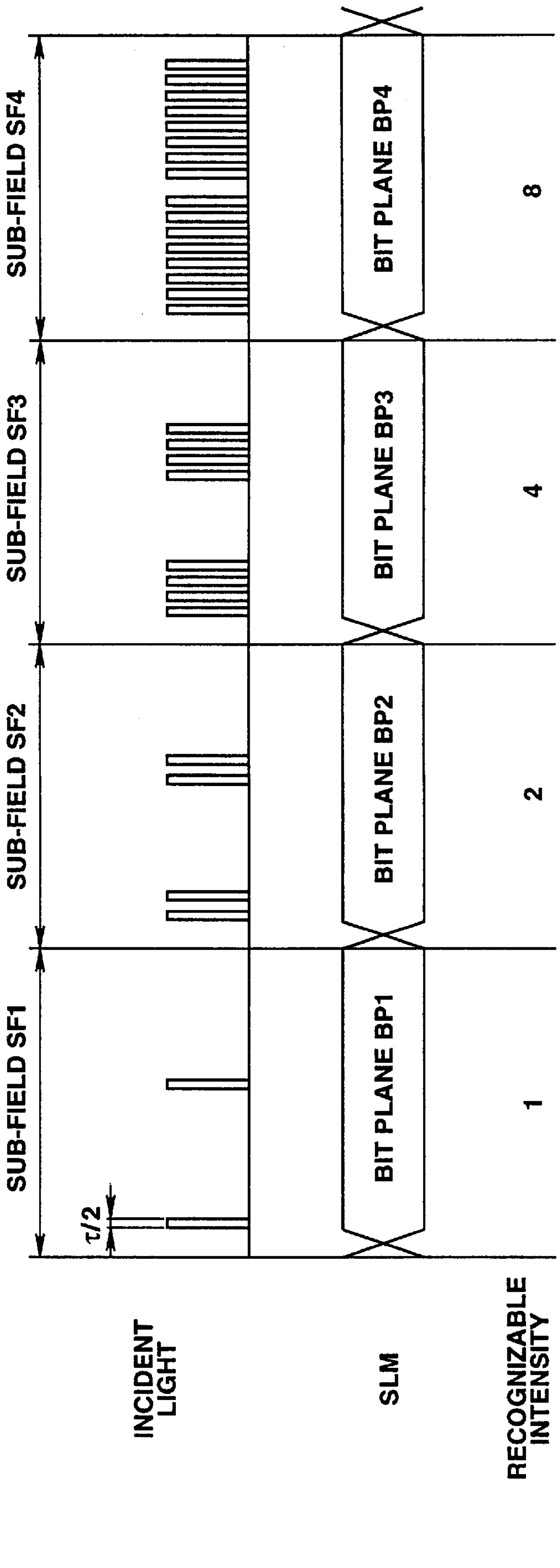
FIG. 14 is an explanatory drawing of a sixth embodiment of the present invention, showing the relation between a light pulse irradiated from a light source to the spatial light modulator, state of display by the spatial light modulator, and an intensity level recognizable by the human eyes.

According to this embodiment, all the sub-fields have a same length of period, the sub-field period is imaginarily divided by two, and the spatial light modulator is irradiated with different numbers of light pulses for the sub-fields, respectively, as illustrated in FIG. 14. It should be noted that the divisor of the sub-field is not limited to two but may be freely set.

According to this embodiment, for the former half of the first sub-field SF1, a light pulse having a width τ/2 is irradiated once to the spatial light modulator 3, and for the latter half, a light pulse having a width τ/2 is irradiated once to the spatial light modulator 3. For the former half of the second sub-field SF2, a light pulse having a width τ/2 is irradiated twice to the spatial light modulator 3 and for the latter half, a light pulse having a width τ/2 is irradiated twice to the spatial light modulator 3. For the former half of the third sub-field SF3, a light pulse having a width τ/2 is irradiated 4 times to the spatial light modulator 3 and for the latter half, a light pulse having a width τ/2 is irradiated 4 times to the spatial light modulator 3. For the former half of the fourth sub-field SF4, a light pulse having a width τ/2 is irradiated 8 times to the spatial light modulator 3 and for the latter half of the fourth sub-field SF4, a light pulse having a width τ/2 is irradiated 8 times to the spatial light modulator As the results of the above pulse modulation, the level of the first bit plane BP1 recognizable by the human eyes is 1. Of the second, third and fourth bit planes BP2, BP3 and BP4, the levels recognizable by the human eyes are 2, 4 and 8, respectively. By superposing these bit planes BP1 to BP4 one on the other, an image is displayed with 16 levels.

As illustrated in FIG. 14, one sub-field is divided into a plurality of sub-fields, and a predetermined number of light pulses is irradiated to each of the sub-divided sub-field, so that the period for which the light source 1 is continuously turned off can be reduced and thus the light can be used more efficiently. Because of the reduced off period, an image flicker due to pulsation of the light from the source 1 can be suppressed.

Seventh Embodiment

Figure 15:
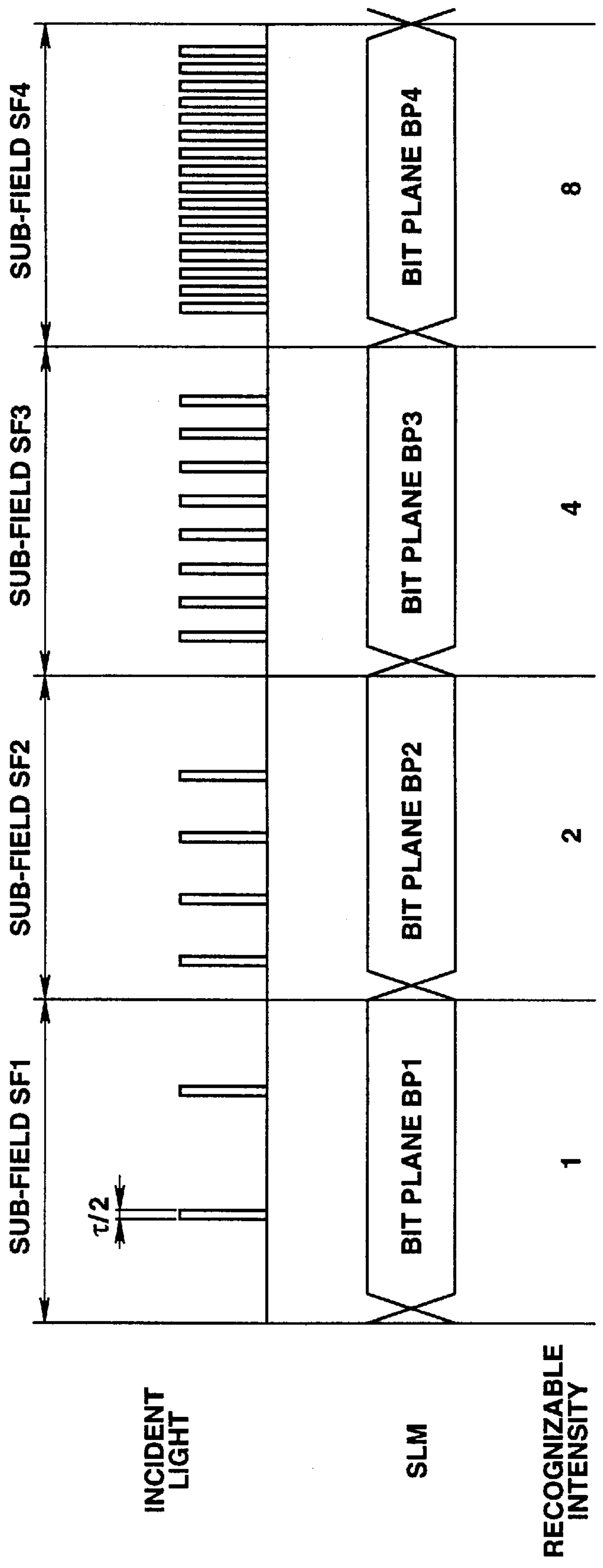
FIG. 15 is an explanatory drawing of a seventh embodiment of the present invention, showing the relation between a light pulse irradiated from a light source to the spatial light modulator, state of display by the spatial light modulator, and an intensity level recognizable by the human eyes.

According to this embodiment, all the sub-fields have a same length of period, and the number of light pulses irradiated to the spatial light modulator 3 is changed for each sub-field period, as illustrated in FIG. 15. The light pulse is emitted at time points nearly uniformly distributed over the sub-field period.

According to the seventh embodiment of the present invention, the period of all the sub-fields is a predetermined length. The period from a time point at which the state of each pixel in the spatial light modulator 3 gets steady until a time point at which each pixel of the spatial light modulator 3 starts changing, namely, at a time point at which a next bit plane starts, is set t. It should be appreciated that if a first irradiation of a light pulse after start of a sub-field is done after the spatial light modulator 3 gets steady, the period t may be same as the sub-field period.

A time point at which each pixel of the spatial light modulator 3 gets steady and a first bit plane BP1 is displayed on the spatial light modulator 3 is set S1, a one at which each pixel of the spatial light modulator 3 gets steady and a second bit plane BP2 is displayed on the spatial light modulator 3 is set S2, a one at which each pixel of the spatial light modulator 3 gets steady and a third bit plane BP3 is displayed on the spatial light modulator 3 is set S3, and a one at which each pixel of the spatial light modulator 3 gets steady and a fourth bit plane BP4 is displayed on the spatial light modulator 3 is set S4.

According to the seventh embodiment, a light pulse having a width τ/2 is irradiated twice to the spatial light modulator 3 for the first sub-field SF1. The light pulse is irradiated at a time point S1+t/3, and at a time point S1+2×t/3, respectively.

For the second sub-field SF2, a light pulse having a width τ/2 is irradiated 4 times to the spatial light modulator 3. The light pulse is irradiated at a time point S2+t/5, at a time point S2+2×t/5, at a time point S2+3×t/5, and at a time point S2+4×t/5, respectively.

For the third sub-field SF3, a light pulse having a width τ/2 is irradiated 8 times to the spatial light modulator 3. The light pulse is irradiated at a time point S3+t/9, at a time point S3+2×t/9, at a time point S3+3×t/9, at a time point S3+4×t/9, at a time point S3+5×t/9, at a time point S3+6×t/9, at a time point S3+7×t/9, and at a time point S3+8×t/9, respectively.

For the fourth sub-field SF4, a light pulse having a width τ/2 is irradiated 16 times to the spatial light modulator 3. The light pulse is irradiated at a time point S4+t/17, at a time point S4+2×t/17, at a time point S4+3×t/17, at a time point S4+4×t/17, at a time point S4+5×t/17, at a time point S4+6×t/17, at a time point S4+7×t/17, at a time point S4+8×t/17, at a time point S4+9×t/17, at a time point S4+10×t/17, at a time point S4+11×t/17, at a time point S4+12×t/17, at a time point S4+13×t/17, at a time point S4+14×t/17, at a time point S4+15×t/17, and at a time point S4+16×t/17, respectively.

As the results of the above pulse modulation, the level of the first bit plane BP1 recognizable by the human eyes is 1, that of the second bit plane BP2 is 2, that of the third bit plane BP3 is 4, and that of the fourth bit plane BP4 is 8. As having previously been described, an image is displayed with 16 levels by superposing the bit planes one on the other.

As illustrated in FIG. 15, according to the present invention, a light pulse is emitted at time points nearly uniformly distributed over the entire sub-field period to reduce the period for which the light source 1 is continuously off, thus the sub-field period can be used effectively. Since the continuous off period is reduced, image flicker due to the pulsation of the light from the source 1 can be suppressed.

Eighth Embodiment

Figure 16:
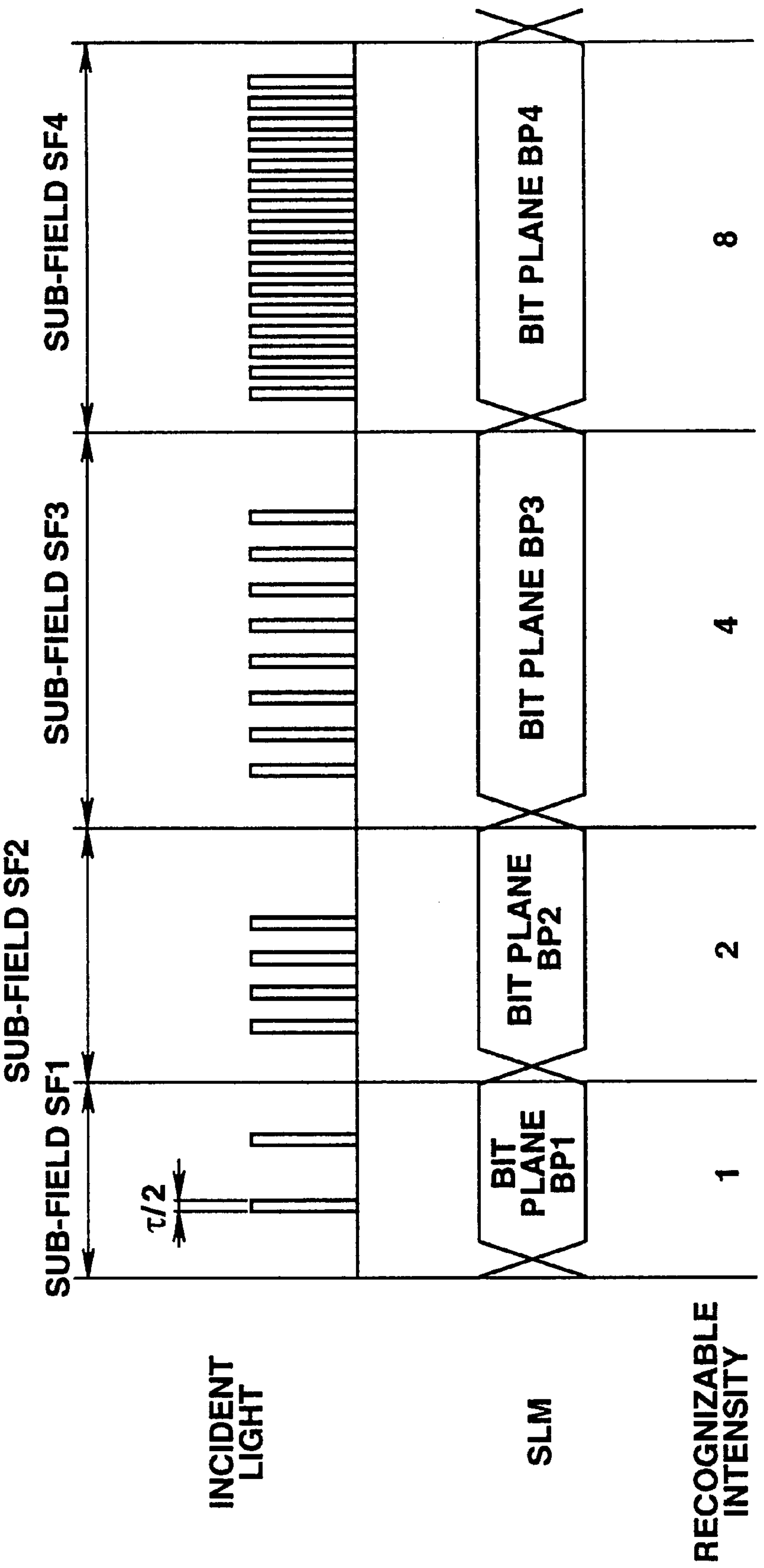
FIG. 16 is an explanatory drawing of an eighth embodiment of the present invention, showing the relation between a light pulse irradiated from a light source to the spatial light modulator, state of display by the spatial light modulator, and an intensity level recognizable by the human eyes.

According to this embodiment, the sub-field period is changed in length while the number of light pulses irradiated to the spatial light modulator 3 is changed for each of the sub-field periods, as shown in FIG. 16. Also, a light pulse is emitted at time points nearly uniformly distributed over the entire sub-field period.

Now it is assumed that the periods of the first and second sub-fields SF 1 and SF2 is t and those of the third and fourth sub-fields are 2×t. Also it is assumed that the state of each pixel in the spatial light modulator 3 gets steady and the first bit plane BP1 is displayed on the spatial light modulator 3, both at a time point S1. Further it is assumed that the state of each pixel of the spatial light modulator 3 gets steady and the first bit plane BP2 is displayed on the spatial light modulator 3, both at a time point S2. Furthermore, it is assumed that the state of each pixel of the spatial light modulator 3 gets steady and the first bit plane BP3 is displayed on the spatial light modulator 3, both at a time point S3. Also it is assumed that each pixel of the spatial light modulator 3 is in the steady state and the first bit plane BP4 is displayed on the spatial light modulator 3, both at a time point S4.

It should be noted that the ratio in period between the sub-fields is not limited to the above but can be freely set.

If a first light pulse is irradiated during a transition of the spatial light modulator 3 under the same aLssumption as in the above, the length of the steady-state period of the spatial light modulator 3 within the periods of the first and second sub-fields SF1 and SF2 should preferably be t while that within the periods of the third and fourth sub-fields SF3 and SF4 should preferably be 2×t.

According to this embodiment, a light pulse having a width τ/2 is irradiated twice to the spatial light modulator 3 for the first sub-field SF1. The light pulse is irradiated at a time point S1+t/3, and at a time point S1+2×t/3, respectively.

For the second sub-field SF2, a light pulse having a width τ/2 is irradiated 4 times to the spatial light modulator 3. The light pulse is irradiated at a time point S2+t/5, at a time point S2+2×t/5, at a time point S2+3×t/5, and at a time point S2+4×t/5, respectively.

For the third sub-field SF3, a light pulse having a width τ/2 is irradiated 8 times to the spatial light modulator 3. The light pulse is irradiated at a time point S3+2×t/9, at a time point S3+4×t/9, at a time point S3+6×t/9, at a time point S3+8×t/9, at a time point S3+10×t/9, at a time point S3+12×t/9, at a time point S3+14×t/9, and at a time point S3+16×t/9, respectively.

For the fourth sub-field SF4, a light pulse having a width τ/2 is irradiated 16 times to the spatial light modulator 3. The light pulse is irradiated at a time point S4+2×t/17, at a time point S4+4×t/17, at a time point S4+6×t/17, at a time point S4+8×t/17, at a time pointl S4+10×t/17, at a time point S4+12×t/17, at a time point S4+14×t/17, at a time point S4+16×t/17, at a time point S4+18×t/17, at a time point S4+20×t/17, at a time point S4+22×t/17, at a time point S4+24×t/17, at a time point S4+26×t/17, at a time point S4+28×t/17, at a time point S4+30×t/17, and at a time point S4+32×t/17, respectively.

As the results of the above pulse modulation, the level of the first bit plane BP1 recognizable by the human eyes is 1, that of the second bit plane BP2 is 2, that of the third bit plane BP3 is 4, and that of the fourth bit plane BP4 is 8. As having previously been described, an image is displayed with 16 levels by superposing the bit planes BP1 to BP4 one on the other.

As illustrated in FIG. 16, the length of the sub-field is changed to decrease the off period of the light source for a bit plane for which a small number of light pulses is irradiated from the light source 1, thus permitting to utilize the light with a higher efficiency. Because of the reduced off period, an image flickering due to pulsation cf the light from the source 1 can be suppressed.

As having been described in the foregoing with reference to the first to eighth embodiments of the present invention, a light pulse can be emitted from the source 1 and modulated to display an image with many levels not by driving the spatial light modulator 3 at a high speed. In the conventional image displaying apparatus, the spatial light modulator 3 is driven at a high speed to change the sub-field. period for each bit plane for displaying an image with many levels. However, since the high response speed of the spatial light modulator 3 is limited, the sub-field period cannot be sufficiently decreased so that it is extremely difficult to increase the number of levels for displaying an image. On the contrary, since a light pulse emitted from the source 1 is modulated in the image displaying apparatus and method according to the present invention, the number of bit planes can be easily increased for more levels even when a sufficient length of sub-field period is secured for operation of the spatial light modulator 3.

As seen from the foregoing description of the present invention, the present invention permits to display an image with a sufficient number of levels even with a spatial light modulator which provides a binary light modulation. Since the light source is turned off during a period of transition in which pixel status is being changed, an image having an excellent quality without intensity nonuniformity even when the spatial light modulator incurs in-plane variation of its characteristics.

What is claimed is:

1. An image displaying apparatus, comprising:

a spatial light modulator having a plurality of pixels formed therein and modulating a light at each pixel thereof in a binary manner correspondingly to a pixel data of an image to be displayed; and a light source which is turned off during changing in state of a pixel formed in the spatial light modulator, and irradiates a light pulse to the spatial light modulator while the pixel state is steady;

the light pulse from the light source being modulated by the spatial light modulator at each pixel to display the image.

2. The apparatus as set forth in claim 1, wherein the light source irradiates to the spatial light modulator a light pulse having a width varied correspondingly to the intensity of an image to be displayed.

3. The apparatus as set forth in claim 2, wherein the light source irradiates more than two light pulses for a period for which the pixel is held in the state steady.

4. The apparatus as set forth in claim 1, wherein the spatial light modulator holds the pixel thereof in the steady state for a period varied correspondingly to the intensity of an image to be displayed.

5. The apparatus as set forth in claim 1, wherein the light source irradiates to the spatial light modulator a number of light pulses which is variable depending on the intensity of an image to be displayed.

6. The apparatus as set forth in claim 5, wherein the spatial light modulator holds the pixel thereof in the steady state for a period varied correspondingly to the intensity of an image to be displayed.

7. The apparatus as set forth in claim 5, wherein the light source emits a light pulse at time points generally evenly distributed over a period for which the pixel state is held in the steady state.

8. The apparatus as set forth in claim 1, wherein the light source irradiates to the spatial light modulator a quantity of light pulse adjusted based on a product of an irradiation length of time and intensity.

9. A method of displaying an image, comprising the steps of:

modulating a light from a light source at each pixel of a spatial light modulator which modulates a light in a binary manner correspondingly to a pixel data of an image to be displayed;

turning off the light source during changing in pixel state of the spatial light modulator; and irradiating a light pulse from the light source to the spatial light modulator while the pixel state of the spatial light modulator is steady.

10. The method as set forth in claim 9, wherein the light source irradiates to the spatial light modulator a light pulse having a width varied correspondingly to the intensity of an image to be displayed.

11. The method as set forth in claim 10, wherein the spatial light modulator holds the pixel thereof in the steady state for a period varied correspondingly to the intensity of an image to be displayed.

12. The method as set forth in claim 10, wherein the light source irradiates more than two light pulses for a period for which the pixel is held in the state steady.

13. The method as set forth in claim 9, wherein the light source irradiates to the spatial light modulator a number of light pulses which is variable depending on the intensity of an image to be displayed.

14. The method as set forth in claim 13, wherein the spatial light modulator holds the pixel thereof in the steady state for a period varied correspondingly to the intensity of an image to be displayed.

15. The method as set forth in claim 13, wherein the light source emits a light pulse at time points generally evenly distributed over a period for which the pixel state is held in the steady state.

16. The method as set forth in claim 9, wherein the light source irradiates to the spatial light modulator a quantity of light pulse adjusted based on a product of an irradiation length of time and intensity.

* * * * *